United States Patent [19]

Fellows

[11] Patent Number: 5,121,249
[45] Date of Patent: Jun. 9, 1992

[54] FIBER OPTIC COMPUTATIONAL NETWORK UTILIZING OPTICAL AND/OR GATE EMPLOYING NON-LINEAR ORGANIC POLYMERS AND PHOTOVOLTAIC/PIEZOELECTRIC OPTICAL INTERFACES

[76] Inventor: William G. Fellows, 8610 Snowden Loop, Laurel, Md. 20708

[21] Appl. No.: 513,472

[22] Filed: Apr. 11, 1990

[51] Int. Cl.$^5$ ............................................. G02F 1/03
[52] U.S. Cl. .................................. 359/316; 364/713; 359/323; 359/311
[58] Field of Search ............. 364/713; 350/354, 96.11, 350/355, 96.13; 359/299, 322, 305, 310, 311, 316, 323

[56] References Cited

U.S. PATENT DOCUMENTS

| | | | |
|---|---|---|---|
| 2,936,380 | 5/1960 | Anderson | 364/713 |
| 4,257,016 | 3/1981 | Kramer, Jr. et al. | 359/305 |
| 4,585,301 | 4/1986 | Bialkowski | 350/96.20 |
| 4,696,551 | 9/1987 | Amano et al. | 359/311 |
| 4,707,081 | 11/1987 | Mir | 359/323 |
| 4,813,772 | 3/1989 | Kowel et al. | 359/322 |
| 4,864,524 | 9/1989 | Guilfoyle et al. | 364/713 |
| 4,941,725 | 7/1990 | Normandin | 350/354 |
| 4,995,693 | 2/1991 | Wilson | 359/305 |

*Primary Examiner*—Rolf Hille
*Assistant Examiner*—Roy Potter
*Attorney, Agent, or Firm*—Saul Elbaum; Jason Shapiro; Paul S. Clohan

[57] ABSTRACT

A multi-channel/multi-layer optical gate contained within a fiber-optic housing having any number of optical cells disposed within the housing. The optical cells are made up of non-linear organic polymers surrounded by a piezoelectric crystal, which is in turn connected to a photovoltaic device. When the photovoltaic device is activated, the piezoelectric crystals cause the non-linear organic polymers to change their refractive index, causing an interruption of a reference laser beam. An output detector is disposed within the fiber-optic housing for detecting the reference laser beam.

5 Claims, 8 Drawing Sheets

FIBER OPTIC COMPUTATIONAL NETWORK UTILIZING OPTICAL AND/OR GATE EMPLOYING NON-LINEAR ORGANIC POLYMERS AND PHOTOVOLTAIC/PIEZOELECTRIC OPTICAL INTERFACES

RIGHTS OF THE GOVERNMENT

The invention described herein may be manufactured, used and licensed by or for the United States Government for Governmental Purposes without payment to me of any royalty thereon.

BACKGROUND OF THE INVENTION

The present invention relates to binary computing operations, and more particularly to a method and apparatus for binary computing which employs an optically implemented Boolean AND and OR gate computing elements using non-linear organic polymers and photovoltaic/piezoelectric optical interfaces.

The parallel and high-speed features of optical systems can be used to fabricate general-purpose optical computers. Much research has been done on the optical realization of parallel processors for multiplication and addition. A parallel two-dimensional multiplication occurs when a two-dimensional spatially modulated light beam is passed through a two-dimensional transparency. Certain two-dimensional spatial light modulators can also produce an output that is the difference between two successive two-dimensional inputs or contains only the moving objects within a two-dimensional input scene. The addition of two two-dimensional data planes occurs if two spatially modulated beams are incident on a detector array simultaneously or sequentially. Various number representations have been used (such as residue arithmetic) to design efficient parallel optical and numerical computers.

The most attractive class of general-purpose optical computers is presently optical linear algebra processors. These systems perform matrix-vector operations and similar linear algebra algorithms, often in a systolic form. A typical system consists of a linear array of input point modulators (for example, laser diodes), each of which is imaged through a different spatial region of an acoustooptic cell. The Fourier transform of the light distribution leaving the cell is formed on a linear output detector array. If the elements of N input vectors are fed simultaneously at time t to the acoustooptic cell, each vector on a different frequency f, then the transmittance of the cell will be N vectors (that is, a matrix A). If the input point modulators are fed in parallel with the elements of another vector x, then the product of the input vector and the N vectors in the cell is formed, and each vector inner product is produced (by the Fourier-transform lens) on a separate output detector. Thus, the system performs N vector inner products or a matrix-vector multiplication in parallel. With various frequency, time, and space encoding techniques, different electrical postprocessing, and various feedback configurations, all of the major linear algebra operations required in modern signal processing can be achieved on this one system. Use of multichannel acoustooptic cells and related architectures can increase the processing capacity of the system and allow optical processing of data to the accuracy possible on digital computers.

OBJECTS AND SUMMARY OF THE INVENTION

A primary object of the present invention is to provide a photoelectric device interfaced with a piezoelectric crystal layer to produce an optical controlling interface for designation of input state.

Another object of the present invention is to provide an optical AND/OR gate in the configuration of an optical computer.

A further object of the invention is to provide a complete optical processing device that employs laser light inputs and outputs.

A still further object of the invention is to provide optical processors and gates directly connected in line with fiber optic lines whereby direct in-line processing of the laser light and the information contained therein can be performed.

The present invention consists of various designs to produce optical computing elements and devices, optical AND/OR gates, fiber optic computing elements, and fiber optic computational networks. The designs employ non-linear organic polymers and materials and special optical state control inputs. Non-linear organic polymers and materials ca be controlled by various interface devices o elements to effect proportional changes in a reference laser beam that is transmitted through the non-linear organic polymer. Non-linear organic polymers react very fast (in the micro-second region) to changes of voltage or acoustic stress waves, such as that produced by piezo-electric crystals or materials. The controlling interfaces of the photovoltaic and piezo-electric devices generate an electrical input that induces proportional stresses in the piezo-electric crystal material, which is directly interfaced to the non-linear organic polymer/material, thus inducing proportional changes in the non-linear organic polymer's index of refraction. This in turn will control or direct the output diffraction of the reference laser light.

DETAILED DESCRIPTION OF THE PREFERRED EMBODIMENTS

In Boolean algebra and digital electronics, the fundamental operations and gates are the AND and OR functions. These functions or gates have a set of inputs which designate or produce a given output. A basic AND and OR function can have three input signals and one output signal as represented by the following tables:

| OR | | | | AND | | | |
|---|---|---|---|---|---|---|---|
| $X_1$ | $X_2$ | $X_3$ | Y | $X_1$ | $X_2$ | $X_3$ | Y |
| 0 | 0 | 0 | 0 | 0 | 0 | 0 | 0 |
| 0 | 0 | 1 | 1 | 0 | 0 | 1 | 0 |
| 0 | 1 | 0 | 1 | 0 | 1 | 0 | 0 |
| 0 | 1 | 1 | 1 | 0 | 1 | 1 | 0 |
| 1 | 0 | 0 | 1 | 1 | 0 | 0 | 0 |
| 1 | 0 | 1 | 1 | 1 | 0 | 1 | 0 |
| 1 | 1 | 0 | 1 | 1 | 1 | 0 | 0 |
| 1 | 1 | 1 | 1 | 1 | 1 | 1 | 1 |

Figure 1:
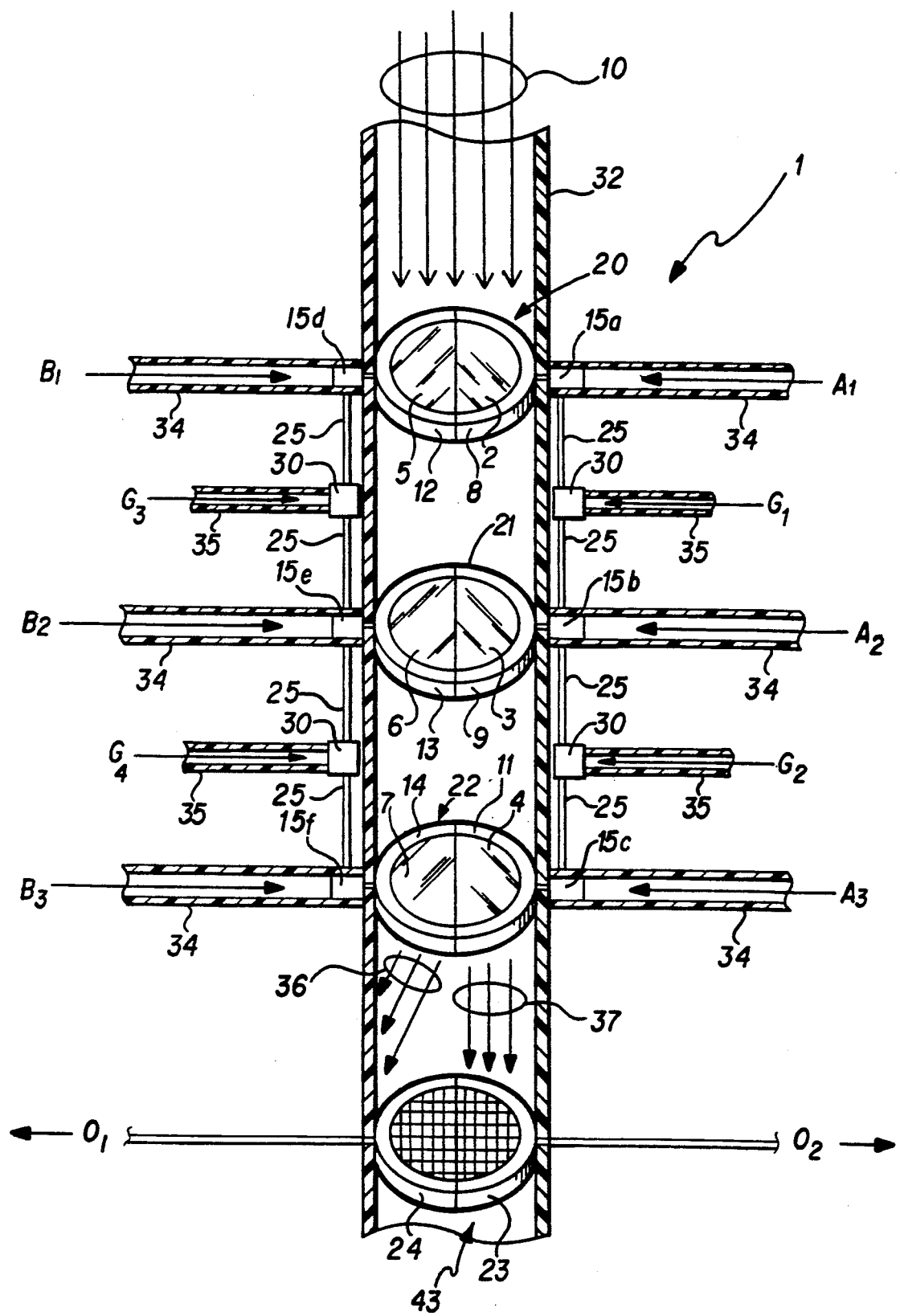
FIG. 1 depicts a combinational optical AND/OR gate employing a gate control input to determine or switch the type of logic function or gate.

The basic elements of the present invention are shown in FIG. 1, which shows the design for an optical gate designated generally by the numeral 1 that has a dual gate configuration with three optical cells 20, 21, 22, three optical input signals for the right channel ($A_1$, $A_2$, $A_3$), three optical input signals for the left channel ($B_1$, $B_2$, $B_3$), and two electrical output signals ($O_1$ and $O_2$). This particular embodiment allows dual channel signal processing utilizing only one reference laser beam 10. While this design could easily incorporate a single channel optical gate, FIG. 1 illustrates that multiple channels (i.e. two or more) can be incorporated into a single optical gate. Similarly, more or less than three input states can be used in a single gate.

The dual channel optical gate shown in FIG. 1 consists of dual sets of non-linear organic polymers; 2, 3, 4 for the right channels, and 5, 6, 7 for the left channels. The use of non-linear organic polymers for optical computers is discussed in U.S. Pat. No. 4,813,772, which is hereby incorporated by reference. Non-linear organic polymers and materials react very fast (micro to nanosecond region) to changes of voltage or acoustic stress waves, such as that produced by piezoelectric crystal materials and voltages generated by photovoltaic devices. Some examples of non-linear organic polymers/materials are: Indathrones, stilbenes, pyridine N-oxides, cyanine dyes, MNA, polyacetylene, and precursor polymer (PFX family).

Each non-linear organic polymer is contained within a piezoelectric crystal half-ring; 8, 9, 11 for the right channels and 12, 13, 14 for the left channels. These combinations of non-linear organic polymers encased within piezoelectric crystal half-rings are combined in pairs to make up optical cells 20, 21, and 22. The optical cells are contained within fiber optic cable 32, which acts as a guide for reference laser beam 10 and a housing for the optical cells. (An alternate method of packaging the non-linear organic polymers would be in a piezoelectric film, such as a flexible piezoelectric plastic film). Connected to each piezoelectric crystal half-ring is a photovoltaic device 15 that responds to input optic signals $A_1$–$A_3$ for the right channel, and $B_1$–$B_3$ for the left channel, which can be laser beams or other known illuminations. The conversion of the input optic signals to electrical signals by the photovoltaic devices can be based on a threshold level of intensity, or a basic on/off light state to represent a 1 for on (optic signal present) and 0 for off (no optic signal). Spacing or distance between the optical cells or non-linear organic cells can and will vary, depending on the fabrication technique and desired optical operation or requirements. The distance or spacing can vary from a fraction of a millimeter to larger distances in centimeters. The smaller the spacing or distance between the cell would most likely be most desirable and optimal in order to decrease the size of the device and its subsequent packing and fabrication.

When an input optic signal that represents the on or 1 state is present photovoltaic device 15 generates a voltage that produces a voltage potential on the piezoelectric crystal half-ring to which it is connected. The piezoelectric crystal half-ring in turn generates an acoustic stress wave through its neighboring non-linear organic polymer causing a change in its index of refraction, thus proportionately affecting reference laser light beam 10 passing through the cell. For example, referring to optical cell 22, when input signal $A_3$ represents input state 1, photovoltaic device $15_c$ generates a voltage and produces a voltage potential on piezoelectric crystal half-ring 11, which in turn generates an acoustic stress wave through non-linear organic polymer 4 causing it to change its index of refraction which allows reference laser beam 37 to pass straight through the right half of optical cell 20. In a similar fashion, when input signal $B_3$ represents input state 0, photovoltaic device $15_f$ does not generate a voltage nor produce a voltage potential on piezoelectric crystal half-ring 14, therefore no acoustic stress wave is passed through non-linear organic polymer 7 and the index of refraction of non-linear organic polymer 7 does not change, therefore reference laser beam 36 does not pass straight through the left half of optical cell 20 but is deflected toward the wall of fiber optic cable 32 as shown.

At the bottom end of optical gate 1 is an output detector 43 which in this embodiment consists of a pair of output detectors 23 and 24. These output detectors can be photo-detectors, PIN diodes, or charged-coupled devices (CCD's) which will detect the presence of a reference laser beam and generate a corresponding output electrical signal $O_1$ and $O_2$. If the laser beam does not reach either output detector, no signal is generated.

It can be seen therefore that FIG. 1 shows three segments or layers in this dual channel optical gate design, each essentially representing one gate input stage that transmits a output to the next gate stage or segment. In this embodiment, reference laser beam 10 can be generated or produced by various sources, such as laser diodes, GaAs diodes, Nd:Yag lasers, HeNe, etc.

For the dual channel optical gate 1 to operate as an OR gate, reference laser beam 10 must be allowed to pass through all three optical cells whenever any input signal is present, therefore, the photovoltaic devices must be connected together so that an input signal to any one of the photovoltaic devices causes all of the photovoltaic devices in the channel to respond. This is accomplished by the use of electrical conduction path or cables 25. Thus in the OR gate configuration, a single optical input which is in the on or 1 state will produce an on or 1 output resulting in the reference laser beam 10 being transmitted to output detector 43. Thus, by interconnecting all the optical inputs, the OR function is achieved. Further, if all optical input states are 0 or off, then there will be no inputs to optical cells 20–22 and thus no change in the index of refraction of the non-linear organic materials and no amount of reference laser beam 10 will pass through to output cell 43, thus the output state will be "0". As stated previously, FIG. 1 depicts a dual channel OR gate with dual outputs, and dual sets of controlling optical inputs. Any number of channels and any number of optical cells could be employed by this design.

Output detectors 23 & 24 which are photo-detection arrays or CCD's are placed in the reference laser beam light transmission path in order to receive and determine the state of the output from the optical cells. Information determination and interpolation can be obtained by measuring the relative light intensity or diffraction angle of the output laser light information beam. When employing relative light intensity, high intensity output or above a certain detection threshold would equate to 1, and low intensity or no laser light would equate to 0 or off. Simply stated, the presence of an output laser light is the on or 1 state, while no detected laser light would be the off or 0 state. When utilizing the diffraction effect on the information output, by controlling the degree or angle of diffraction of the output laser information beam, the output state can be determined. This is achieved by controlling the degree of diffraction occurring to the reference laser beam that is propagating through this optical gate by controlling the index of refraction of the non-linear organic polymer material. For the optical gates and computing elements, the gate is in an off condition when there exists an extreme diffraction of the reference laser beam, essentially blocking the light to produce the 0 state. The on or 1 state would be produced when minimal or no diffraction occurs to the laser beam. Employment of the diffraction measurement of output would be most feasible from a practical design point of view due to the reference laser beam being able to be left on continuously.

To further control optical gate 1, a linking switch 30 can be added in-line on electrical conduction path or cables 25. Linking switch 30 is controlled by an optical gate signal $G_1$–$G_4$ which is fed through fiber optical cables 35. In this configuration, optical gate 1 can now function as an optical AND gate or an optical OR gate, depending upon the status of linking switches 30. An optical signal to engage the linking switch between the photovoltaic devices will allow a joint conduction path for the optical input signals thus producing an optical OR gate. A signal or lack of signal to leave open the linking switch between photovoltaic devices 15 would create an optical AND gate. Multiple gate control inputs employed to independently control the separate conduction links between each segment or gate would effectively produce a serial connection of optical AND and OR gates or computational elements. In the AND configuration, each input signal $A_1$-$A_3$ and $B_1$-$B_3$ is independent or separate from each other as no connection exists between the two sets of controlling optical inputs. This design feature will produce the optical AND gate computational logic of zero unless all ones or on conditions exist for the set of controlling inputs. This will result in the output detector generating a 0 or off output. Any 0 or off optical input will result in the non-linear organic polymers in an off or blocking state to the reference laser beam, producing the required 0 or off output state. If all input signals are 1's, then the reference laser beam will be transmitted to the output detector which will generate the on or 1 output state.

Figure 2:
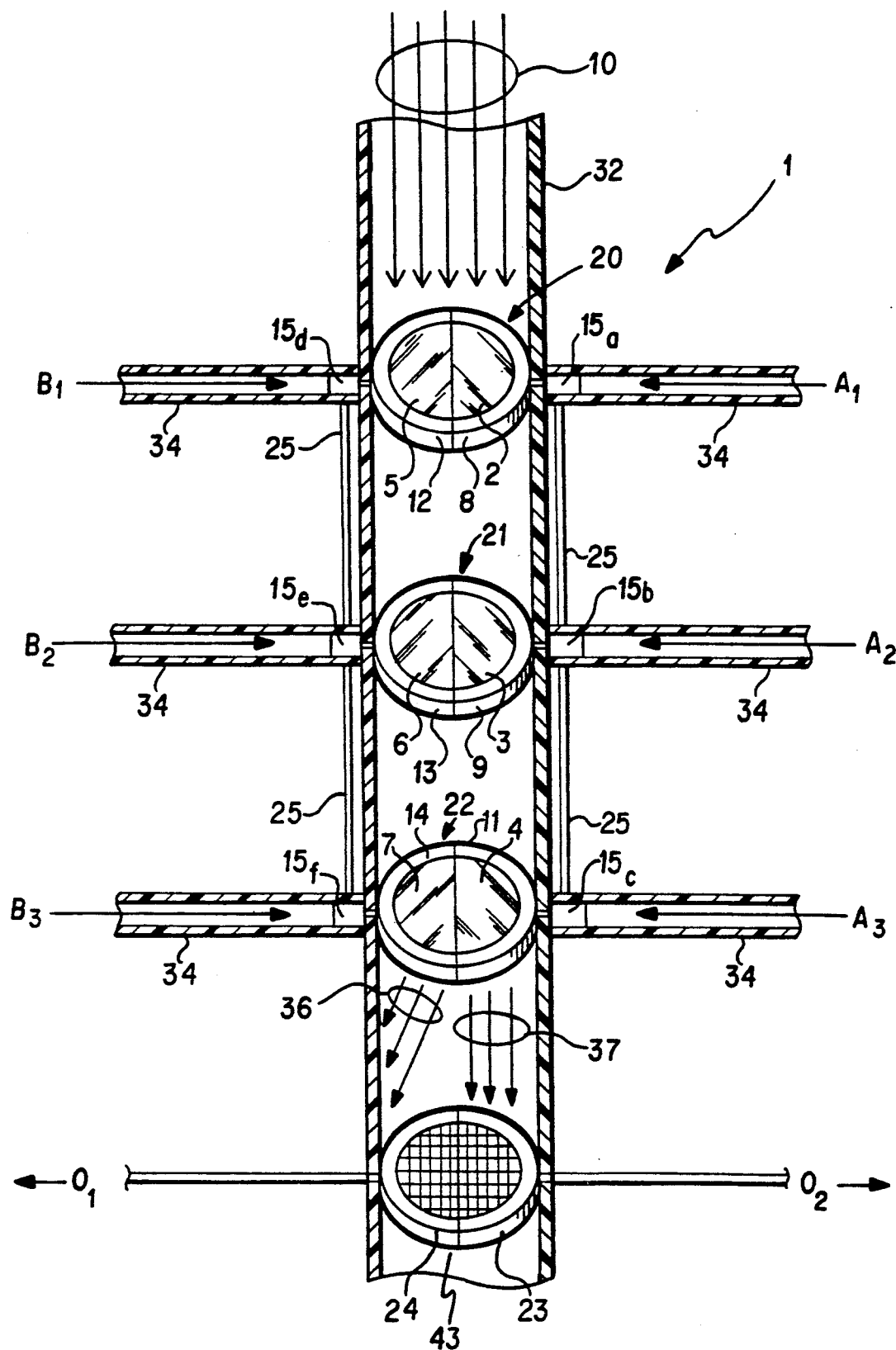
FIG. 2 depicts a dedicated optical OR gate for optical processing and logic operation.

FIG. 2 depicts a dedicated optical OR gate which is produced by removing or leaving out linking switches 30 and fiber optic cables 35 with the conduction path or cables 25 remaining. A dedicated optical OR gate may be desired in some applications. Operations and functions of the dedicated optical OR gate are the same as those described for FIG. 1.

Figure 3:
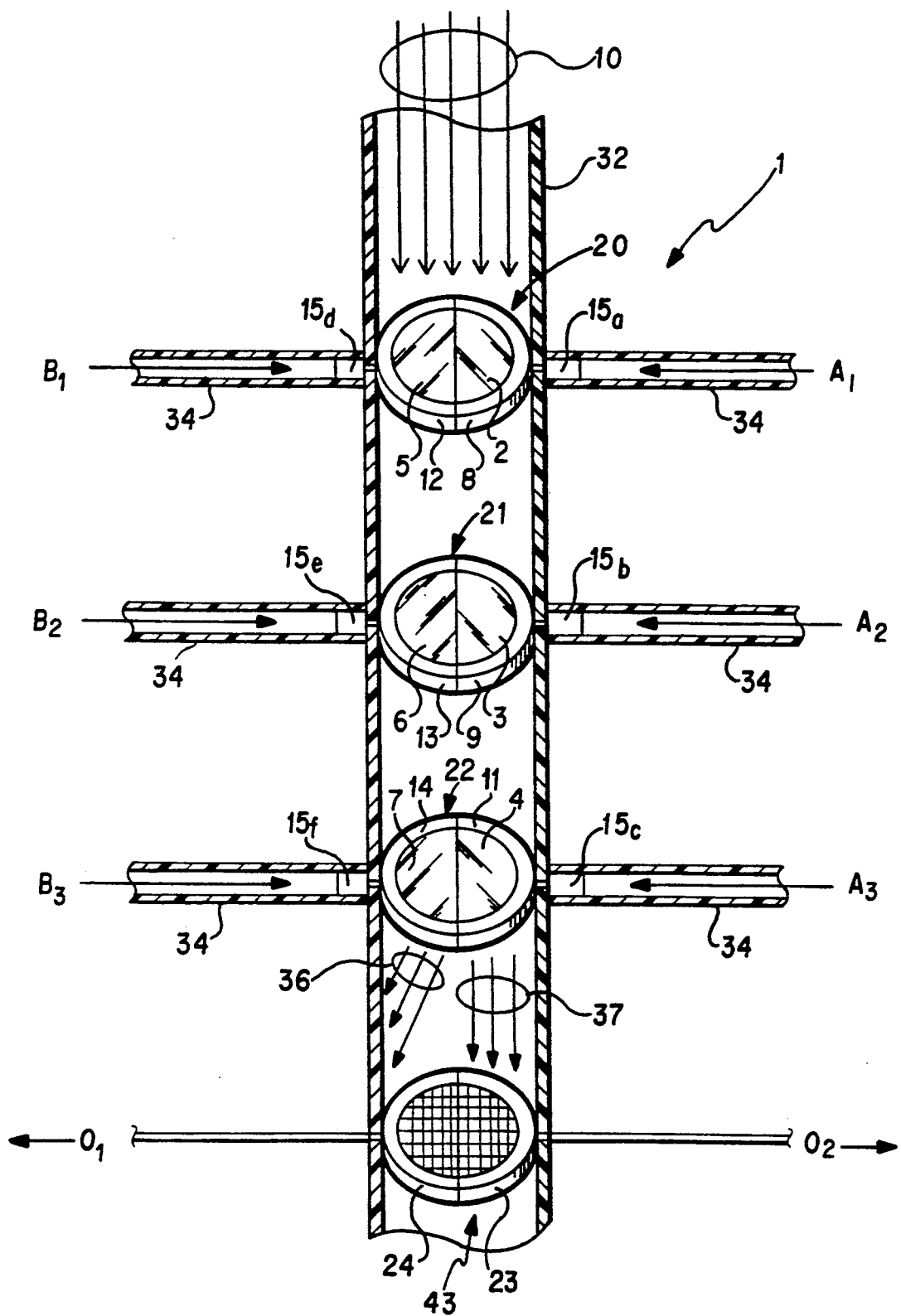
FIG. 3 depicts a dedicated optical AND gate for optical processing and logic operation.

FIG. 3 depicts a dedicated optical AND gate, hach has the linking switches 30, fiber optical cables 35, and conduction path or cables 25 removed or not fabricated as part of the optical gate. Operations and functions for the dedicated optical AND gate of FIG. 3 are the same as described for FIG. 1 and are embodied in such. Special applications may require fabrication of dedicated AND/OR gates as shown in FIG. 2 and 3.

Figure 4:
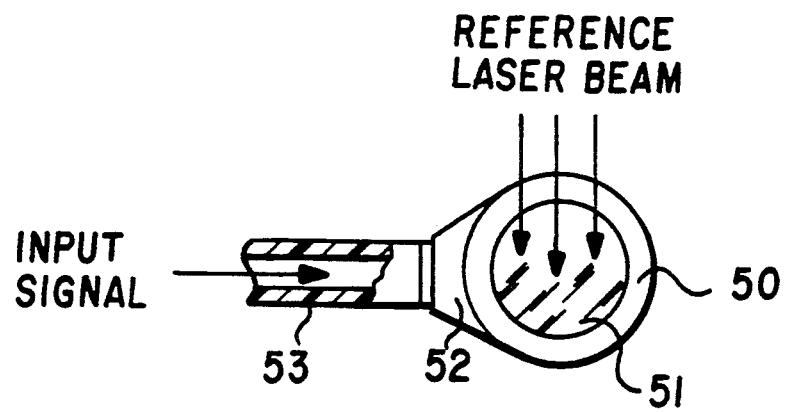
FIG. 4 depicts the design for the optical interface employing the photovoltaic to piezoelectric interface showing a circular configuration for fiber optics.
Figure 5:
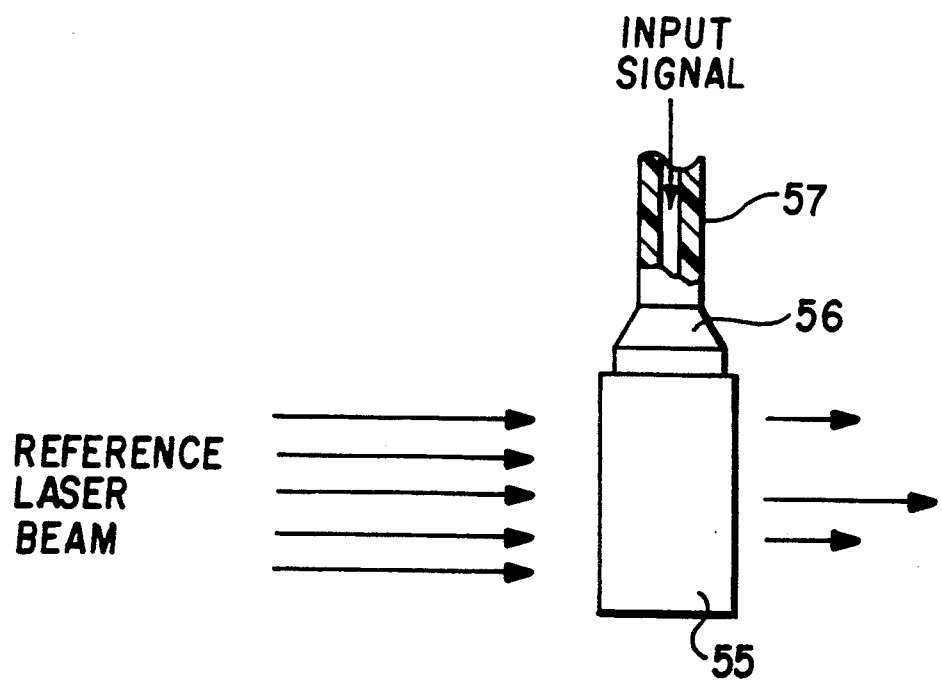
FIG. 5 depicts the design for the optical interface employing the photovoltaic to piezoelectric interface showing a rectangular configuration which can be used in integrated optic applications.

FIG. 4 shows an embodiment for a single fiber optics implementation employing a circular piezoelectric ring 50, and FIG. 5 shows an embodiment for an integrated optics application in which piezoelectric element 55 is rectangular. In FIG. 4, piezoelectric ring 50 encases non-linear organic polymer 51, with the photovoltaic/optical cable interface connected to the piezoelectric crystal material as shown; element 52 is the photovoltaic device and the fiber optic cable is shown as 53. In FIG. 5, piezoelectric element 55 encases the non-linear organic polymer, with the photovoltaic/optical cable interface connected to the piezoelectric crystal material as shown; element 56 is the photovoltaic device and the fiber optic cable is shown as 57. If stacked, insulator inserts or barriers would separate the different cells or elements comprising the optical gates, allowing and producing the multiple gates and processing elements in each segment or gate stage. Also, the controlling input state interface connections or layers can be placed in various or optimal positions or locations on the ring for receiving the optical inputs.

Figure 6:
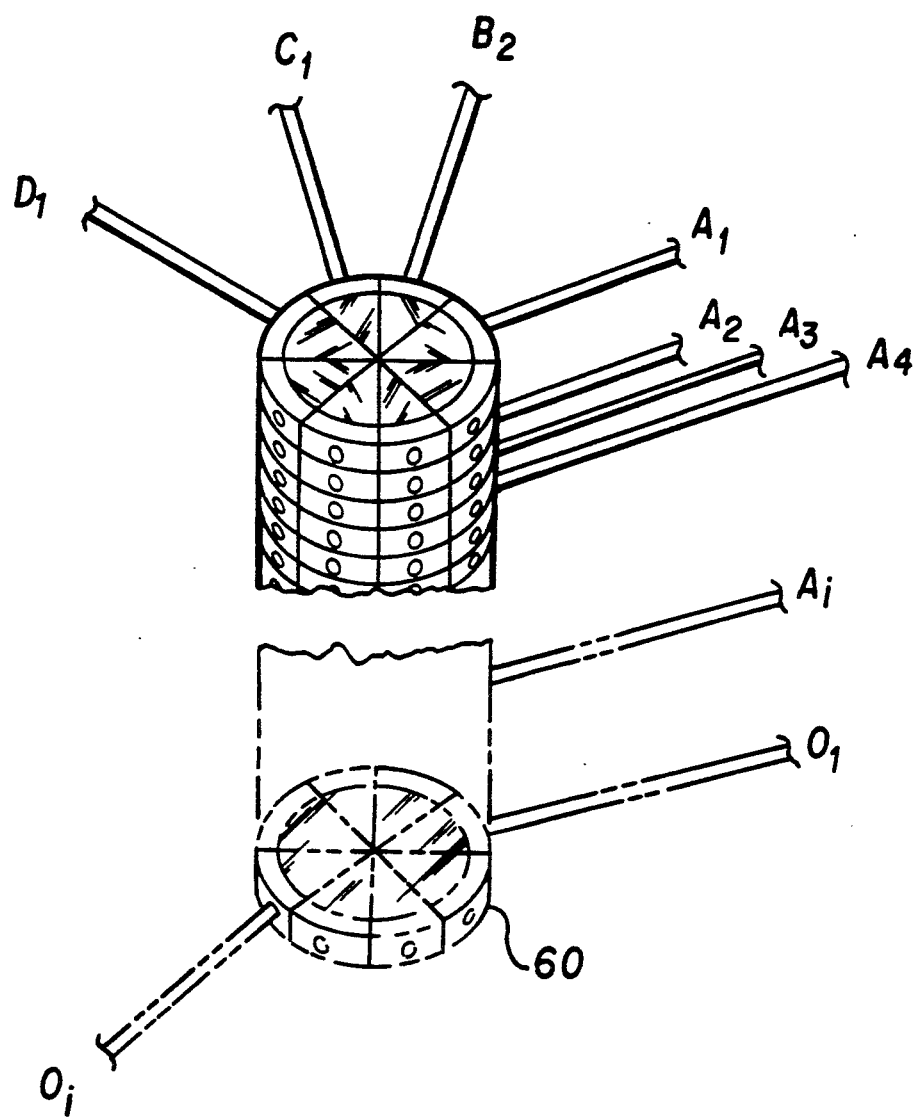
FIG. 6 depicts the central optical processing unit with multiple inputs and outputs comprised of layered optical AND/OR processing gates and elements.

FIG. 6 shows an embodiment incorporating multi-channel and multi-layer stages of optical AND/OR computational elements that can parallel process multiple inputs ($A_1$—$A_i$, $B_1$—$B_i$, etc.) and produce or process a number of outputs ($O_1$—$O_j$). The outputs can be equated to the number of bits being processed, similar to a 4 bit, 8 bit, 16 bit, or 32 bit processor or processing device. Output detector 60 is placed at the receiving path of the reference laser beam for translation, interpolation, and storage of the processed light information. In addition, another optical processing device of this design can be placed in line, or multiples of these devices can be networked in line, performing many levels or layers of processing. The outputs of these optical computational/processing devices can become the generated inputs to other stages/levels of associated optical processor units to produce a network or complete computer system. This is shown in FIG. 8 where fiber optic links can direct the flow of reference laser beams and processed information light throughout the fiber optic network, with both light outputs and inputs being interconnected, creating a purely fiber optic or optical computer system.

Figure 7:
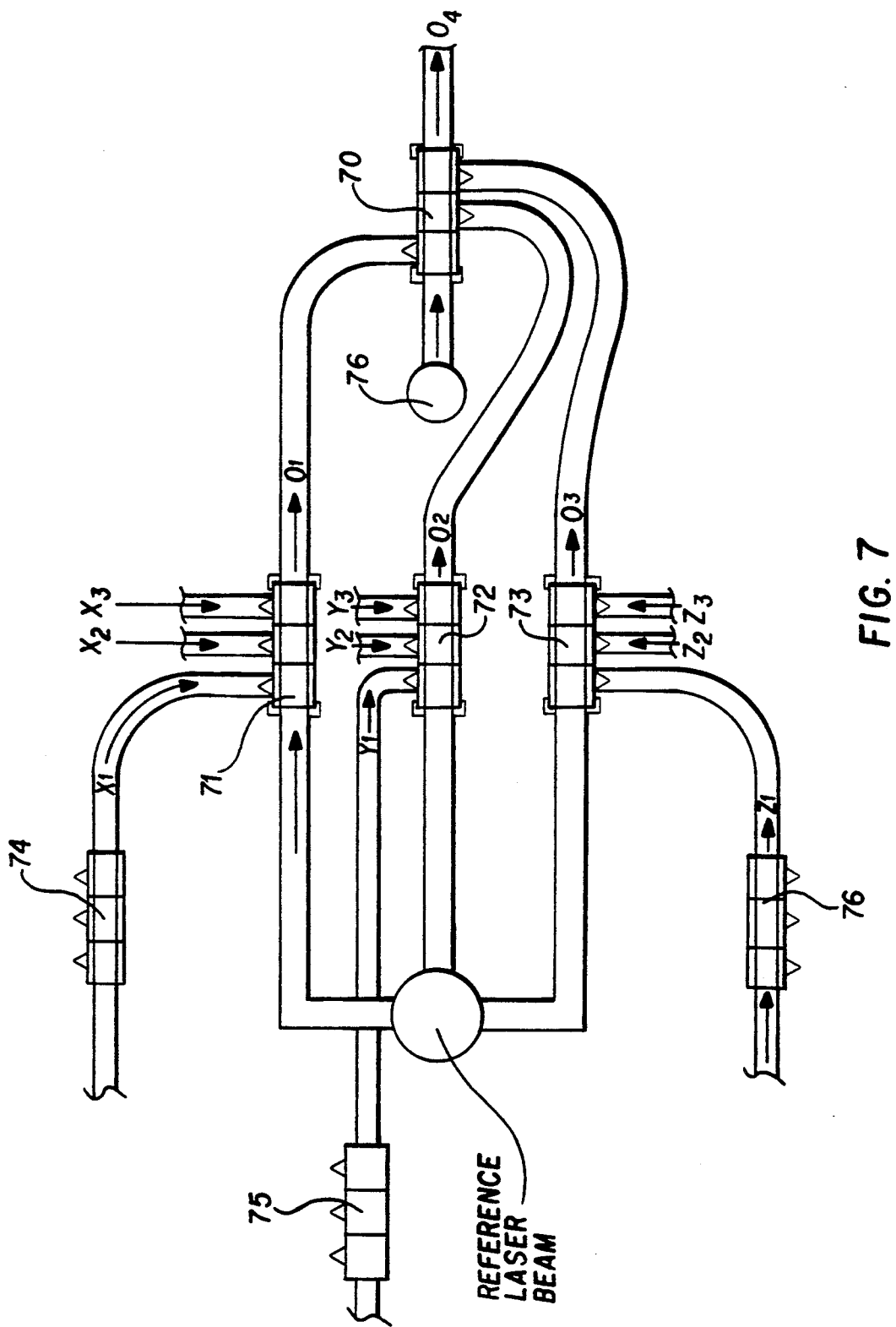
FIG. 7 depicts a multi-layered optical computing element that can be inserted directly in-line with fiber optics cables.

FIG. 7 shows how the multi-channel and multi-layer stages of the embodiment shown in FIG. 6 for optical processing units, optical AND/OR gates, or a combination thereof can be placed in line with the fiber optic cable. In this embodiment, the fiber optic cable is shown by the numeral 61, the optical cells by the numerals 62–65, and the output detector by the numeral 66. Multiple stages or levels of processing can thus be achieved in line with the fiber optic cable.

Figure 8:
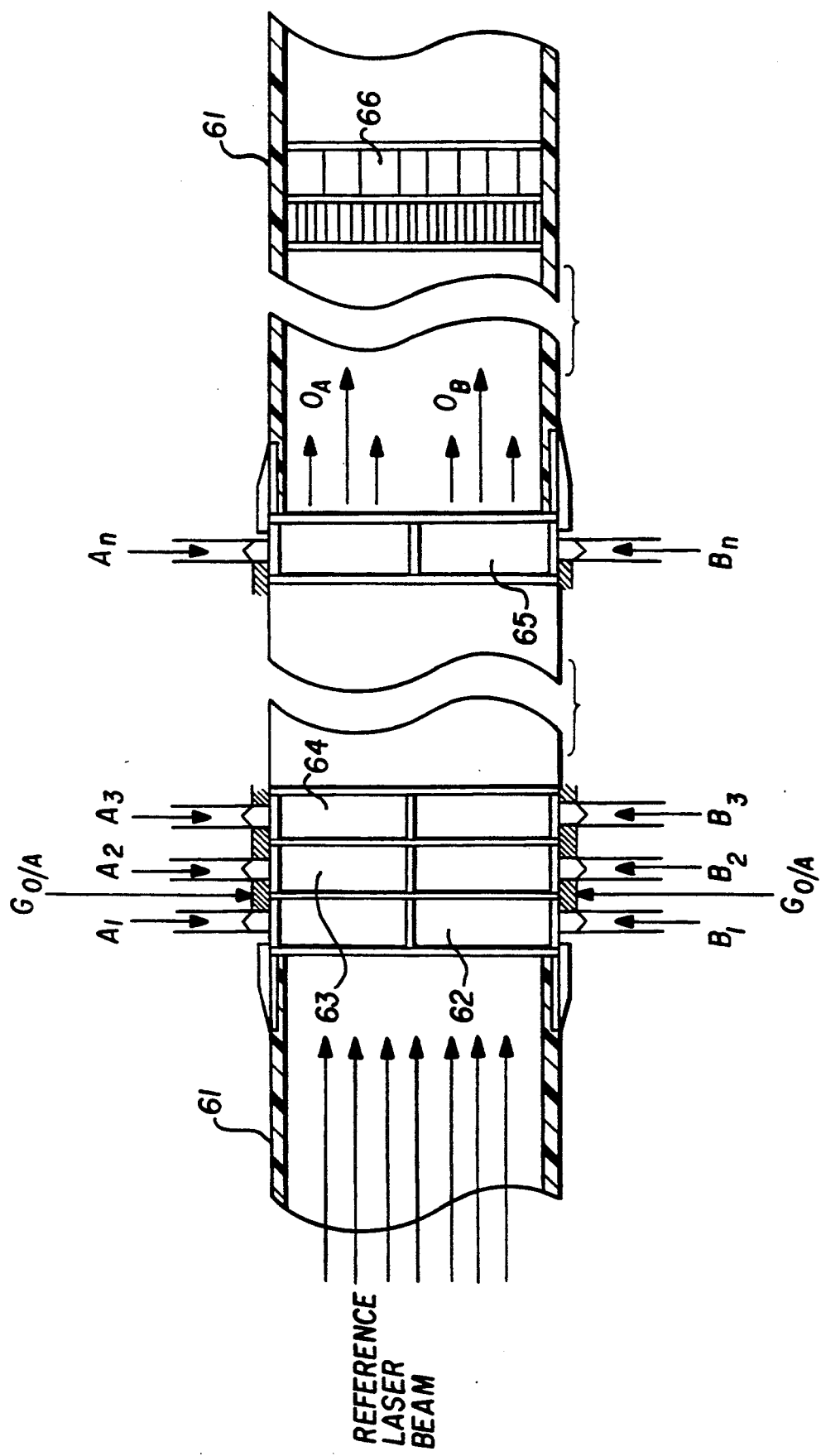
FIG. 8 depicts a fiber optic computational network using optical computing elements.
Figure 9:
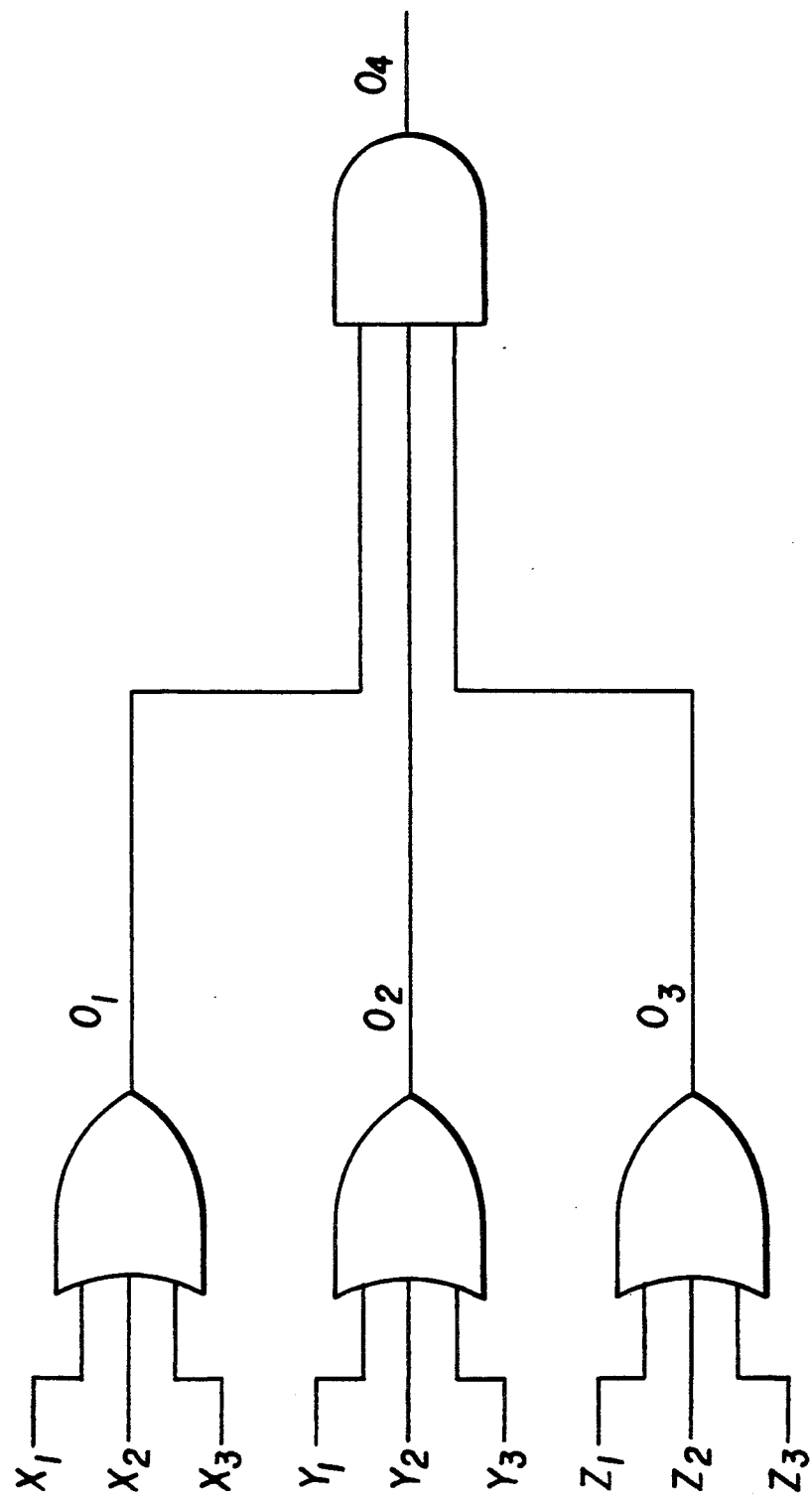
FIG. 9 is a schematic diagram of the fiber optic computational network shown in FIG. 8.

FIG. 8 shows how a complete optical computer using fiber optic cables and the optical computing devices described above with their photovoltaic and piezoelectric controlling interfaces can be arranged. The schematic equivalent is shown in FIG. 9. Optical OR gates 71, 72, and 73 are controlled by input signals $X_1$, $Y_1$, and $Z_1$, which emanate from optical computational elements 74, 75, and 76. This embodiment can also be extended or transferred for building integrated optical packages, producing the same or similar optical processing capabilities and logic gate functioning. Further, the controlling interfaces can be a combination or stand alone configuration of the photovoltaic and piezoelectric devices or layers. FIG. 8 also shows that there can be a reference laser beam feeding the main optic network and a separate laser diode reference source 76 attached to or feeding a singular device as shown by optical AND gate 70 having dedicated light source 76. Embodiments of these devices can have separate laser diodes as sources to or integrated into designated optical processing units or optical gates.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A fiber optic computational network comprising:
   a plurality of optical OR gates each of which comprises a housing, at least one optical cell disposed within said housing, said optical cell comprising at least one optical element having a variable index of refraction, for each optical element in said optical cell a means connected to said optical element for inputting an electrical input signal to said optical element so as to affect the index of refraction of said optical element, and an electrical connection between each of said means connected to said optical element for inputting an electrical input signal to said optical element, wherein said optical element having a variable index of refraction comprises a non-linear organic polymer attached to a piezoelectric crystal;
   a plurality of optical AND gates each of which comprises a housing, at least one optical cell disposed within said housing, said optical cell comprising at least one optical element having a variable index of refraction, for each optical element in said optical cell a means connected to said optical element having a variable index of refraction for inputting an electrical input signal to said optical element, wherein said optical element having a variable index of refraction comprises a non-linear organic polymer attached to a piezoelectric crystal;
   a plurality of fiber-optic disposed between at least one reference laser and said plurality of optical AND and OR gates, and between at least one output detector and said plurality of optical AND and OR gates.

2. The device of claim 1 wherein said optical element having a variable index of refraction comprises a non-linear organic polymer wrapped in a flexible piezoelectric plastic film.

3. The device of claim 1 further comprising a linking switch disposed within said electrical connection.

4. The device of claim 3 wherein said linking switch is controlled by an optical signal.

5. The device of claim 1 wherein said means connected to said optical element for inputting an electrical input signal to said optical element so as to affect the index of refraction of said optical element comprises a photovoltaic device disposed within a fiber optic cable.

* * * * *